United States Patent
Hayden et al.

(10) Patent No.: US 9,651,029 B2
(45) Date of Patent: May 16, 2017

(54) WIND TURBINE TOWER (71) Applicant: Blade Dynamics Limited, Cowes, Isle of Wight (GB)

(72) Inventors: Paul Hayden, New Orleans, LA (US); Joaquin Gutierrez, New Orleans, LA (US)

(73) Assignee: Blade Dynamics Limited, Cowes, Isle of Wright (GB)

( * ) Notice: Subject to any disclaimer, the term of this patent is extended or adjusted under 35 U.S.C. 154(b) by 0 days.

(21) Appl. No.: 14/627,644

(22) Filed: Feb. 20, 2015

(65) Prior Publication Data

US 2015/0159635 A1 Jun. 11, 2015

Related U.S. Application Data (63) Continuation of application No. PCT/GB2013/052220, filed on Aug. 22, 2013.

(30) Foreign Application Priority Data

Aug. 23, 2012 (GB) .................................. 1215004.1

(51) Int. Cl.
*E04H 12/02* (2006.01)
*F03D 11/04* (2006.01)
(Continued)

(52) U.S. Cl.
CPC .............. *F03D 11/04* (2013.01); *E04H 12/02* (2013.01); *E04H 12/08* (2013.01); *E04H 12/085* (2013.01); *F03D 13/20* (2016.05); *F05B 2240/912* (2013.01); *F05B 2250/611* (2013.01); *F05B 2260/301* (2013.01); *F05B 2260/96* (2013.01);
(Continued)

(58) Field of Classification Search
CPC ....... E04H 12/085; E04H 12/08; E04H 12/02; E04H 12/00; Y02E 10/728; F03D 11/04; F05B 2240/912; F05B 2240/913; F05B 2240/95

See application file for complete search history.

(56) References Cited

U.S. PATENT DOCUMENTS 2,767,461 A 10/1956 Lebold et al.
3,487,518 A 1/1970 Hopefield
(Continued)

FOREIGN PATENT DOCUMENTS

CN 101532474 A 9/2009
CN 101564897 A 10/2009
(Continued)

OTHER PUBLICATIONS

Jackson K J et al: Innovative Design approaches for large wind turbine blades, Wind Energy, Wiley, Chichester, GB, vol , No. 2, Apr. 1, 2005 (Apr. 1, 2005), pp. 141-171, XP002440739, ISSN: 1099=1824, DOI: 10.1002WE.128, p. 142, p. 146-p. 150, figures 1, 5, table 1.
(Continued)

*Primary Examiner* — Adriana Figueroa
(74) *Attorney, Agent, or Firm* — Dority & Manning, P.A.

(57) ABSTRACT

A self-supporting wind turbine tower with walls comprising an upper portion (12) and a lower portion (14). Substantially all of the upper portion (12) is formed from a composite plastic. Substantially all of the lower portion (14) is formed from mild steel.

17 Claims, 11 Drawing Sheets

(51) Int. Cl.
  *E04H 12/08* (2006.01)
  *F03D 13/20* (2016.01)
(52) U.S. Cl.
  CPC ............ *F05B 2280/2006* (2013.01); *F05B 2280/6003* (2013.01); *F05B 2280/6013* (2013.01); *Y02E 10/728* (2013.01)

(56) References Cited

U.S. PATENT DOCUMENTS

| | | | |
|---|---|---|---|
| 3,531,901 A | 10/1970 | Will, Jr. et al. | |
| 3,980,894 A | 9/1976 | Vary et al. | |
| 4,120,998 A | 10/1978 | Olez | |
| 4,580,380 A | 4/1986 | Ballard | |
| 4,643,646 A | 2/1987 | Hahn et al. | |
| 4,662,587 A | 5/1987 | Whitener | |
| 4,732,542 A | 3/1988 | Hahn et al. | |
| 4,752,513 A | 6/1988 | Rau et al. | |
| 4,976,587 A | 12/1990 | Farone et al. | |
| 5,096,384 A | 3/1992 | Immell et al. | |
| 5,145,320 A | 9/1992 | Blake et al. | |
| 5,273,819 A | 12/1993 | Jex | |
| 5,281,454 A | 1/1994 | Hanson | |
| 5,670,109 A | 9/1997 | Derees | |
| 5,688,571 A * | 11/1997 | Quigley et al. | 428/36.1 |
| 5,735,486 A | 4/1998 | Piening et al. | |
| 6,139,278 A | 10/2000 | Mowbray et al. | |
| 6,287,666 B1 | 9/2001 | Wycech | |
| 6,295,779 B1 | 10/2001 | Canfield | |
| 6,332,301 B1 | 12/2001 | Goldzak | |
| 7,267,868 B2 | 9/2007 | Gallet et al. | |
| 7,371,304 B2 | 5/2008 | Christman et al. | |
| 7,438,524 B2 | 10/2008 | Lyders et al. | |
| 7,625,185 B2 | 12/2009 | Wobben | |
| 7,810,757 B2 | 10/2010 | Kirkwood et al. | |
| 7,976,275 B2 | 7/2011 | Miebach et al. | |
| 8,012,299 B2 | 9/2011 | Hancock | |
| 8,079,818 B2 | 12/2011 | Burchardt et al. | |
| 8,172,542 B2 | 5/2012 | Hirano et al. | |
| 8,500,408 B2 | 8/2013 | Baker et al. | |
| 8,764,401 B2 | 7/2014 | Hayden et al. | |
| 8,905,718 B2 | 12/2014 | Hayden et al. | |
| 2002/0053179 A1 | 5/2002 | Wycech | |
| 2004/0018091 A1 | 1/2004 | Rongong et al. | |
| 2004/0048022 A1 * | 3/2004 | Pratt | 428/36.91 |
| 2004/0226255 A1 | 11/2004 | Holloway | |
| 2005/0106029 A1 | 5/2005 | Kidegaard | |
| 2006/0070340 A1 | 4/2006 | Fanucci et al. | |
| 2006/0083611 A1 | 4/2006 | Wobben | |
| 2006/0152011 A1 | 7/2006 | Fraenkel | |
| 2007/0036659 A1 | 2/2007 | Hibbard | |
| 2007/0140861 A1 | 6/2007 | Wobben | |
| 2007/0189903 A1 | 8/2007 | Eyb | |
| 2007/0251187 A1 * | 11/2007 | Schiffer et al. | 52/741.14 |
| 2007/0264124 A1 | 11/2007 | Mueller et al. | |
| 2008/0069699 A1 | 3/2008 | Bech | |
| 2008/0075603 A1 | 3/2008 | Van Breugel | |
| 2008/0274319 A1 * | 11/2008 | Berksoy et al. | 428/36.91 |
| 2009/0068017 A1 | 3/2009 | Rudling | |
| 2009/0075084 A1 | 3/2009 | Kochi et al. | |
| 2009/0162206 A1 | 6/2009 | Zirin et al. | |
| 2009/0162208 A1 | 6/2009 | Zirin et al. | |
| 2009/0226320 A1 | 9/2009 | Torres Martinez | |
| 2009/0226702 A1 | 9/2009 | Madsen et al. | |
| 2009/0246446 A1 | 10/2009 | Backhouse | |
| 2009/0252614 A1 | 10/2009 | Schibsbye | |
| 2009/0313913 A1 * | 12/2009 | Malheiro De Aragao et al. | 52/40 |
| 2010/0062238 A1 | 3/2010 | Doyle et al. | |
| 2010/0084079 A1 | 4/2010 | Hayden et al. | |
| 2010/0086409 A1 | 4/2010 | Whiley et al. | |
| 2010/0116938 A1 | 5/2010 | Kline et al. | |
| 2010/0132884 A1 | 6/2010 | Baehmann | |
| 2010/0135817 A1 | 6/2010 | Wirt et al. | |
| 2010/0140947 A1 | 6/2010 | McEntee et al. | |
| 2010/0143143 A1 | 6/2010 | Judge | |
| 2010/0162567 A1 | 7/2010 | Kirkwood et al. | |
| 2010/0307097 A1 * | 12/2010 | Word et al. | 52/651.07 |
| 2010/0310379 A1 | 12/2010 | Livingston | |
| 2011/0036495 A1 | 2/2011 | Cinquin | |
| 2011/0047900 A1 * | 3/2011 | Holmes | 52/173.1 |
| 2011/0061332 A1 * | 3/2011 | Hettick | B29C 70/30  52/651.07 |
| 2011/0138707 A1 | 6/2011 | Bagepalli | |
| 2011/0138729 A1 * | 6/2011 | Shiraishi | 52/651.01 |
| 2011/0175365 A1 | 7/2011 | Hines et al. | |
| 2011/0176915 A1 | 7/2011 | Keir et al. | |
| 2012/0294724 A1 | 11/2012 | Broome et al. | |
| 2013/0022472 A1 | 1/2013 | Hayden et al. | |
| 2013/0042573 A1 * | 2/2013 | Fingerson et al. | 52/834 |
| 2013/0224020 A1 * | 8/2013 | Dagher et al. | 416/84 |
| 2013/0340384 A1 | 12/2013 | Hayden et al. | |
| 2013/0340385 A1 | 12/2013 | Hayden et al. | |
| 2014/0086752 A1 | 3/2014 | Hayden et al. | |
| 2014/0234109 A1 | 8/2014 | Hayden et al. | |

FOREIGN PATENT DOCUMENTS

| | | | |
|---|---|---|---|
| DE | 3811427 | | 5/1988 |
| DE | 19737966 | | 8/1998 |
| DE | 102 35 496 | | 2/2004 |
| DE | 203 20 714 | U1 | 1/2005 |
| DE | 10 2008 055540 | | 6/2009 |
| EP | 0 863 358 | | 9/1998 |
| EP | 1 262 614 | A2 | 12/2002 |
| EP | 1624137 | A1 * | 2/2006 |
| EP | 1 880 833 | | 1/2008 |
| EP | 2 111 971 | A2 | 10/2009 |
| EP | 2 186 622 | | 5/2010 |
| EP | 2 341 240 | A1 | 7/2011 |
| EP | 2 400 147 | A1 | 12/2011 |
| FR | 2 710 871 | A1 | 4/1995 |
| FR | 2 863 321 | A1 | 6/2005 |
| FR | 2 919 819 | | 2/2009 |
| GB | 1229595 | | 4/1971 |
| GB | 2041829 | | 9/1980 |
| JP | 2006-336555 | A | 12/2006 |
| JP | 2007-209923 | | 8/2007 |
| KR | 2012-0077650 | A | 7/2012 |
| WO | WO 97/03820 | A1 | 2/1997 |
| WO | WO 97/30651 | | 8/1997 |
| WO | WO 02/43947 | A1 | 6/2002 |
| WO | WO 03/035380 | | 5/2003 |
| WO | WO 03/057457 | A1 | 7/2003 |
| WO | WO 03/069099 | A1 | 8/2003 |
| WO | WO 2004/029448 | | 4/2004 |
| WO | WO 2005/011964 | | 2/2005 |
| WO | WO 2006/002621 | | 1/2006 |
| WO | WO 2007012200 | A1 * | 2/2007 | ............ G06F 17/50 |
| WO | WO 2007012201 | A1 * | 2/2007 | ............ B29C 70/30 |
| WO | WO 2007/073735 | A1 | 7/2007 |
| WO | WO 2009/034291 | | 7/2008 |
| WO | WO 2008/136717 | A1 | 11/2008 |
| WO | WO 2009/077192 | | 6/2009 |
| WO | WO 2009/126996 | | 10/2009 |
| WO | WO 2009/130467 | | 10/2009 |
| WO | WO 2010/023140 | | 3/2010 |
| WO | WO 2010/092168 | A2 | 8/2010 |
| WO | WO 2010/114794 | | 10/2010 |
| WO | WO 2011007065 | A1 * | 1/2011 |
| WO | WO 2011/064553 | A2 | 6/2011 |
| WO | WO 2011/092474 | A2 | 8/2011 |
| WO | WO 2011/106733 | | 9/2011 |
| WO | WO 2012/004571 | | 1/2012 |
| WO | WO 2012/164305 | | 1/2012 |
| WO | WO 2012/061710 | A2 | 5/2012 |
| WO | WO 2013/061016 | A1 | 5/2013 |
| WO | WO 2014/030007 | | 2/2014 |

OTHER PUBLICATIONS

TPI Composites, Sandia National Laboratories: "Innovative Design Approaches for Large Wind Turbine Blades", Albuquerque, New Mexico, Mar. 21, 2003 (Mar. 31, 2003), XP002682109, Retrieved (56) References Cited

OTHER PUBLICATIONS from the Internet: URL http://prod.sandia.gov/techlib/access-control.cgi/2003/030723.pdf [retrieved on Aug. 21, 2012], pp. 20-21, figure 3.3, table 3/1.
International Search Report and Written Opinion in corresponding PCT Application No. PCT/GB2013/052220, dated Dec. 2. 2013, 10 pgs.
Search Report in corresponding UK Application No. GB1215004.1, dated Jan. 11, 2013, 4 pgs.
English translation only—Wind Energy Engineering, Liu Qing Yu, Liaoning Nationalities Publishing House Article, pp. 383-389.
English translation only—CN Office Action, Jan. 18, 2017.

\* cited by examiner

WIND TURBINE TOWER

INCORPORATION BY REFERENCE TO ANY PRIORITY APPLICATIONS

This application is a continuation of Patent Cooperation Treaty International Patent Application PCT/GB2013/052220, filed Aug. 22, 2013, and entitled "WIND TURBINE TOWER," which is incorporated by reference herein in its entirety, and which claims priority to United Kingdom Patent Application GB1215004.1, filed on Aug. 23, 2012.

BACKGROUND

Field

The present invention relates to wind turbine towers. In particular, the present invention relates to self-supporting wind turbine towers.

Description of the Related Art

Conventional towers for large wind turbines are generally either tubular steel towers, lattice towers, or concrete towers. Most are tubular steel towers which are formed from several 20-30 meter sections bolted together in situ. The tower is then fixed either to a foundation made of concrete using anchor bolts (onshore), to a mono pile, gravity or tripod foundation (off-shore, shallow), or to a floating foundation (off-shore, deep water).

When designing a wind turbine tower, it is necessary to consider its natural frequency in relation to the passing frequencies of the rotor. These passing frequencies are defined as the frequency of one complete revolution of the rotor and the frequency of any blade passing the tower, i.e. the rotating frequency of the complete rotor, divided by the number of blades. If the natural frequency of the tower is in the region of either of the passing frequencies of the rotor, resonance may occur causing the magnitude of the vibrations felt by the turbine to increase.

The natural frequency of a tower decreases in proportion to its length squared. Thus, the natural frequencies of longer towers are typically lower than those of shorter towers. As tower lengths have increased in order to accommodate larger blades, the natural frequency of a conventional tower may lie close to the passing frequencies of the rotor. Consequently, longer towers can be susceptible to resonance which may result in damage to the turbine components or tower foundations.

This problem is compounded by the fact that turbines are usually designed to work within a certain range of rotational speeds. Thus, the passing frequencies to be avoided are generally frequency ranges, rather than narrow bands or fixed amounts.

US 2009/0266004 discloses a wind turbine tower formed from a carbon fibre composite. The tower is fabricated by preparing a flexible textile preform offsite, transporting the preform to the assembly location, placing the preform over a mandrel and laminating the preform with a resin to form the composite shell. As the natural frequency of a tower is proportional to the square root of the specific stiffness of the material from which the tower is made (the specific stiffness being an inherent property of the material and which is defined as $E/\rho$, where E is the Young's modulus and $\rho$ is the density), the use of a stiff carbon fibre composite results in a tower with an increased natural frequency. Consequently, the tower is less prone to excitation modes under varying load conditions. However, carbon fibre composite towers are significantly more expensive to manufacture than equivalent steel towers.

US 2011/0138707 discloses a wind turbine tower having a concrete lower portion and a steel upper portion and teaches that this arrangement allows the height of a conventional steel tower to be increased without a corresponding increase in the difficulty of tower construction and transport.

However, when constructed, such a tower will have a lower natural frequency in comparison to a smaller, conventional steel tower. Consequently, the natural frequently may lie close to the passing frequencies of the rotor, increasing the risk of resonance and the associated damage to the turbine components or tower foundations.

SUMMARY

According to the present invention, there is provided a self-supporting wind turbine tower with walls comprising an upper portion and a lower portion, wherein the upper and lower portions are connected together to form the tower, wherein substantially all of the upper portion is formed from a composite plastic, and wherein substantially all of the lower portion is formed from mild steel.

With this arrangement, favourable frequency characteristics can be achieved for a long tower, relative to one formed entirely from steel, and without the expense of forming the tower entirely from a composite plastic. This is due to the fact that the specific stiffness of the lower portion of the tower has been found to have far less of an effect on the overall natural frequency of the tower in comparison to the stiffness of the upper portion of the tower.

Further, by forming the upper portion from a composite plastic, a lower mass of material is required to meet the particular stiffness requirements for a given installation. Thus, the total mass of the tower can be reduced. This, combined with the increased natural frequency of the tower, can result in a noticeable reduction in static and fatigue loads at the foundation.

Preferably, the upper portion comprises 20 to 80% of the length of the tower.

The upper portion may be a unitary component.

Alternatively, the upper portion may be subdivided into a plurality of segments. In addition to simplifying the transport of the upper portion, subdividing the upper portion also reduces the cost of tooling and of any ovens used during production and makes the upper portion easier to manufacture and inspect. It also allows the mechanical properties of the upper portion to be closely controlled by using factory controlled pre-cured segments. This is not possible with the textile preform arrangement of US 2009/0266004. The plurality of segments may be arranged in an axial direction of the tower and/or in a hoop direction of the tower.

The upper and lower portions may be connected directly. Alternatively, a gasket may be positioned between the upper and lower portions to create an even pressure distribution between the two parts. The upper portion and/or the lower portion may be hollow.

The composite plastic may be a fibre reinforced plastic selected from a group including standard modulus carbon fibre, intermediate modulus carbon fibre, high modulus carbon fibre, and basalt.

In a preferred example, between 50% and 100% of the fibres are arranged at 0 degrees to the axial direction, up to 50% of the fibres are arranged at +/−45 degrees to the axial direction and up to 30% of the fibres are arranged at 90 degrees to the axial direction.

Optionally, the composite plastic comprises a viscoelastic material to increase the hysteric damping characteristics of the tower. The viscoelastic material may be provided as a viscoelastic core. Alternatively, the composite plastic may comprise a fibre reinforced plastic having a viscoelastic polymer matrix.

Preferably, an outer surface of the tower comprises any of undulations, cavities, or protrusions arranged to reduce drag and/or vorticity downwind of the tower.

Preferably, the upper portion and/or the lower portion has a wall thickness which varies along the length of that portion. In this manner, material can be removed from where it is not needed in order to improve the dynamic behaviour of the tower.

The specific stiffness of the upper portion may be at least 60 GPa/(g/cm$^3$).

In a preferred example, the specific stiffness of the lower portion is less than 30 GPa/(g/cm$^3$).

BRIEF DESCRIPTION OF THE DRAWINGS

An example of the present invention will now be described with reference to the following drawings in which.

DETAILED DESCRIPTION

Figure 1:
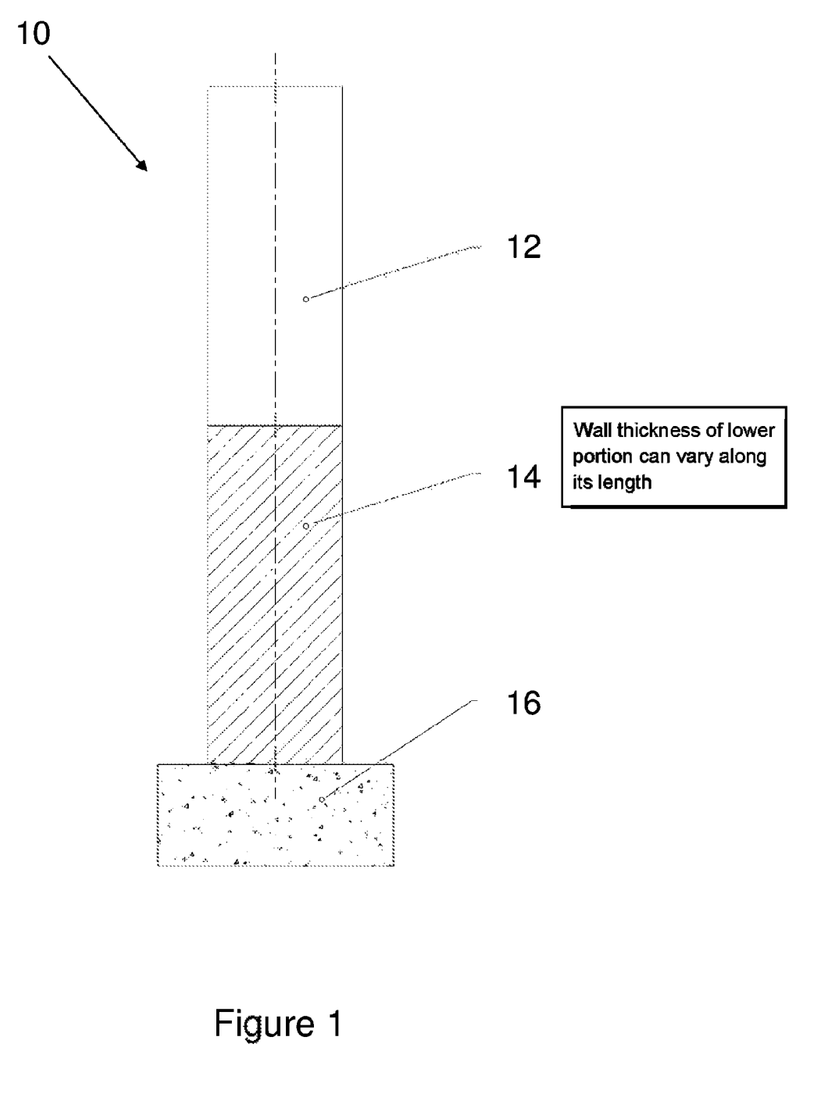
FIG. 1 is a schematic section view of a wind turbine tower in accordance with the present invention.

As shown in FIG. 1, the tower 10 comprises an upper portion 12 made from a composite plastic and a lower portion 14 made from a mild steel. The upper portion 12 and the lower portion 14 are connected together to form the tower 10, which is mounted on a foundation 16 in a manner known in the art.

Figure 2:
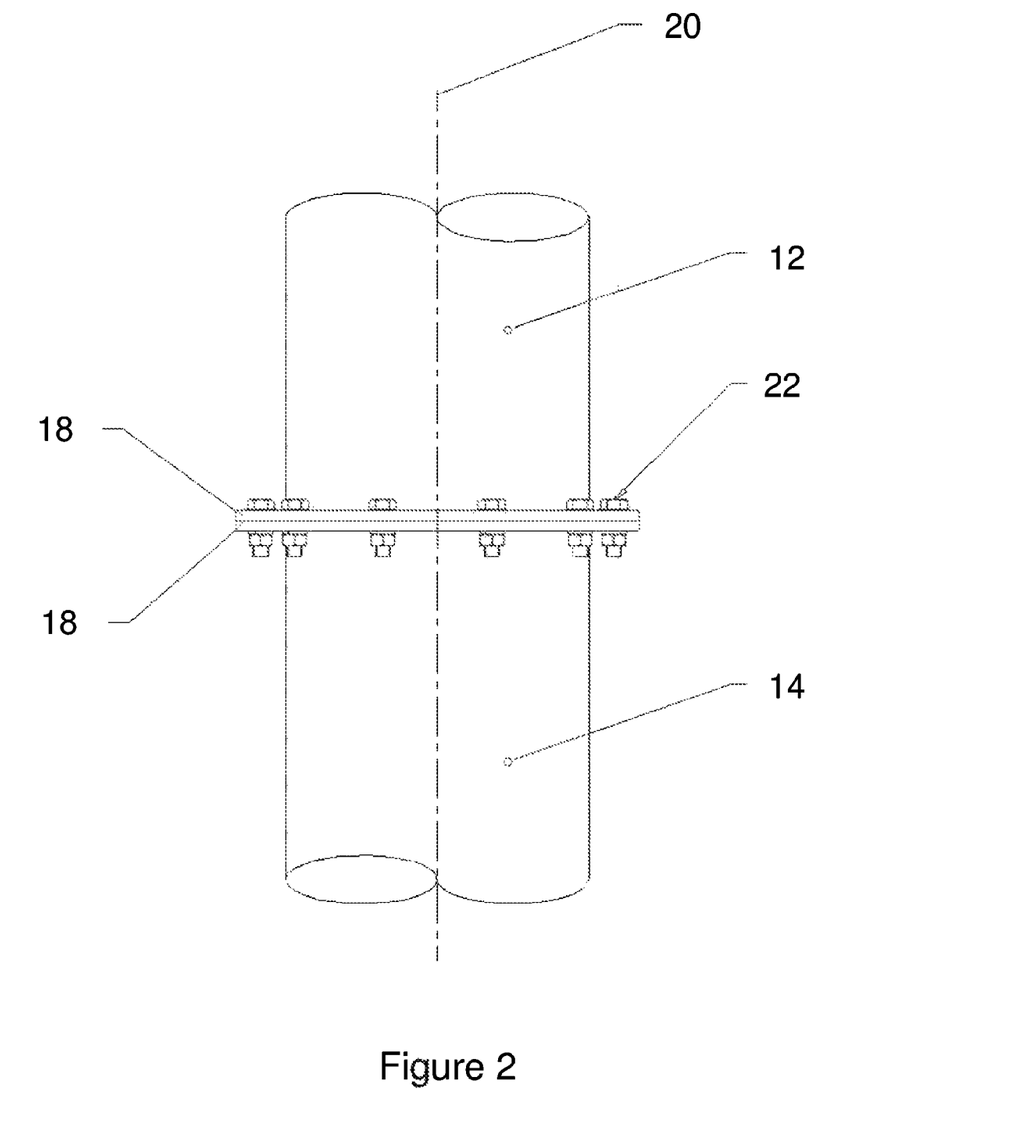
FIG. 2 is a partial side view of the wind turbine tower of FIG. 1, showing the connection between upper and lower portions.

To connect the upper portion 12 and the lower portion 14, each have at one end an outwardly extending peripheral flange 18, as shown in FIG. 2. The upper and lower portions 12, 14 are positioned such that they are coaxial along the longitudinal axis 20 of the tower 10 and the flanges 18 are connected together using bolts 22.

The composite plastic, from which the upper portion 12 is made, has a high specific stiffness, i.e. has a specific stiffness of at least 60 GPa/(g/cm$^3$).

Suitable composite plastics for the upper portion 12 include, but are not limited to, plastic reinforced with any of standard modulus carbon fibre (HSC), intermediate modulus carbon fibre (IMC), high modulus carbon fibre (HMC), basalt, or a combination thereof. The composite plastic can be built using wet lamination, infusion, RTM or prepreg, among other conventional methods. The construction can be monolithic, sandwiched, or stiffened (e.g. orthogrid, stringers and rings, etc.), depending on the structural requirements of the upper portion 12. The material placement can be achieved by hand, filament winding, automated tape placement or by any other suitable method.

Figure 3:
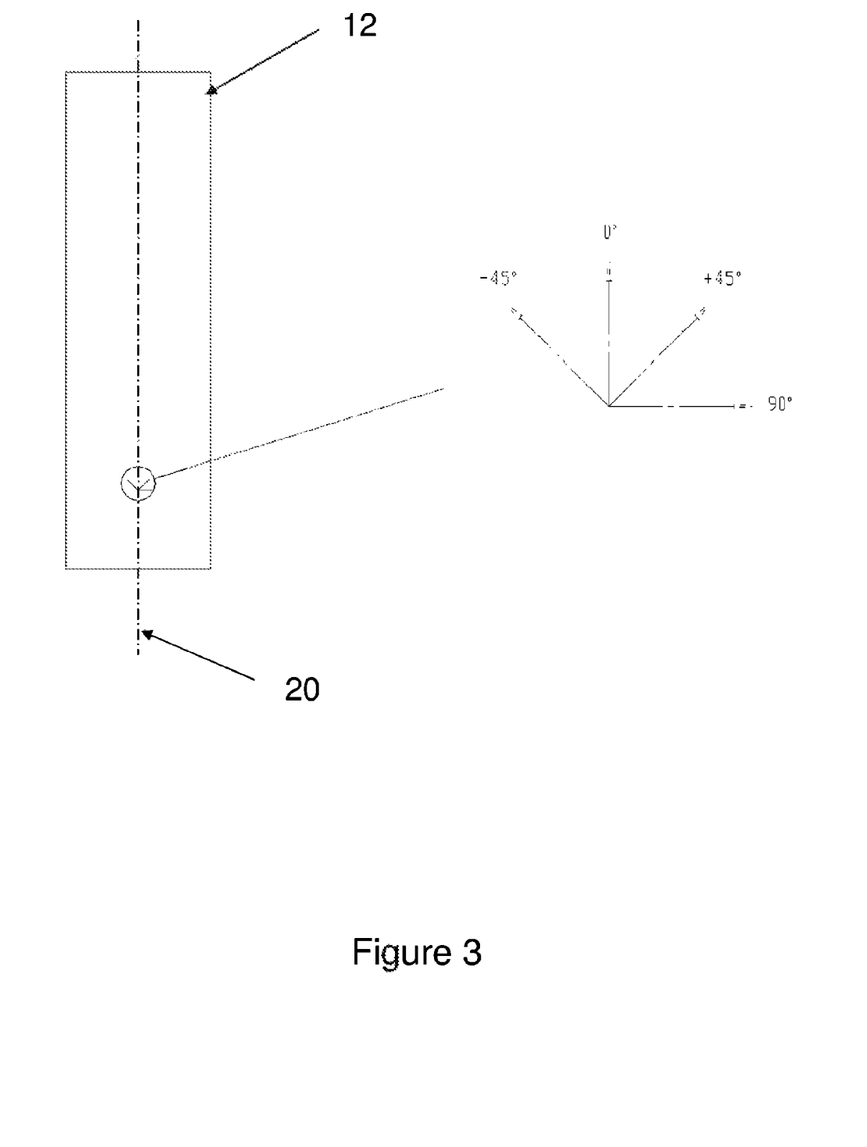
FIG. 3 is a schematic side view of the upper portion of the wind turbine tower of FIG. 1, which illustrates the fibre orientation.

Ideally the composite plastic is a laminate with between 50% to 100% of fibres at 0 degrees, 0% to 50% of fibres at +/−45 degrees, and 0% to 30% of fibres at 90 degrees. As shown in FIG. 3, "0 degrees" indicates that the fibres are parallel to the longitudinal axis 20 of the tower 10 and "90 degrees" indicates that the fibres are perpendicular the axis 20, i.e. running along the hoop direction. The 0 degree material can be laid up uniformly distributed or can be added as pre-cured or pre-consolidated stacks.

Other fibre orientations between +/−20 degrees and +/−70 degrees are also possible. Different materials can be combined, for example the 0 degree fibres can be made of HSC or Basalt and the off-axis plies can be made of fibre glass. Likewise, the 0 degree fibres can be made of IMC or HMC and the off-axis plies can be made of HSC.

In this example, the upper portion 12 comprises Standard Modulus Carbon Fibre embedded in epoxy resin, with a Fibre Volume Fraction (FVF) of 56% and with 80% of the fibres at 0 degrees, 15% of the fibres at +/−45 degrees and 5% of the fibres at 90 degrees. With this arrangement, the upper portion 12 has a specific stiffness of approximately 76 GPa/(g/cm$^3$) and the lower portion 14 has a specific stiffness of approximately 27 GPa/(g/cm$^3$).

Figure 4:
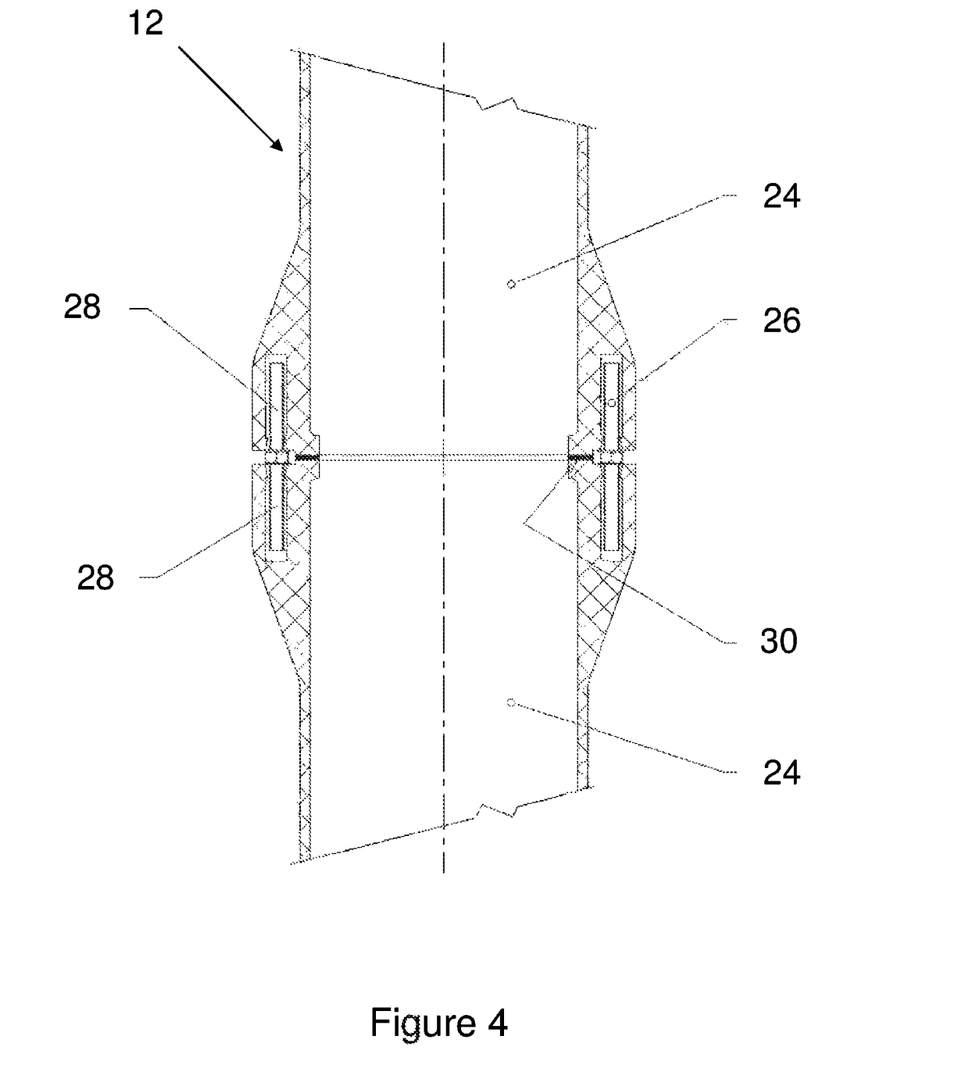
FIG. 4 is a partial section view of a connection between sections of the upper portion of the tower of FIG. 1.

As shown in FIG. 4, the upper portion 12 is formed from a plurality of tubular sections 24. Each section is between 2 and 6 meters in diameter and between 5.8 to 45 meters in length. In this example, consecutive tubular sections 24 are connected together using root insert connections 26, as described in our earlier application International Patent Publication No. WO 2010/041008. The only difference is that the root insert connections 26 are provided on both the sections 24 being joined and studs 28 with right-handed and left-handed threads are used to join the sections 24 together. In WO 2010/041008, root insert connections are provided on one piece and conventional bolts are used to fix that piece to an adjacent structure. A gasket 30 is disposed between tubular sections 24 to create an even pressure distribution from the pretension.

In this example, the upper portion 12 is 40 meters long, has an external diameter of 3.5 to 4 meters and a thickness of between 20 mm and 30 mm, and the lower portion 14 is 40 meters long, has an external diameter of 4 meters and a thickness of between 14 mm and 18 mm. The two are connected to form the tower 10, which is 80 meters tall.

With this arrangement, the tower 10 has a natural frequency of 1.55 Hz, whereas an equivalent tower constructed entirely of mild steel would have a natural frequency of 0.97 Hz. This represents a 59% increase in natural frequency.

Further, the total mass of the tower is reduced by approximately 24% in comparison to an equivalent tower constructed of mild steel. As the total mass of the tower 10 is reduced and its natural frequency increased, the static and fatigue loads at the foundation are reduced. Reducing the self-weight of the tower also further increases the natural frequency, due to diminished compressive load.

Moreover, the use of composite materials yields an increased safety factor for a given component mass. The specific strength, which is defined as the material strength divided by its density, of mild steel is 32 MPa/(g/cm$^3$), while for uni-directional HSC-epoxy 56% FVF along the fibre direction it is 767 MPa/(g/cm$^3$).

Although the wind turbine tower 10 is described as being formed from an upper portion 12 made from a composite plastic with a first stiffness and a lower portion 14 made from a mild steel with a second stiffness, the tower 10 could be formed from a number of sections each having different stiffnesses.

Figure 5:
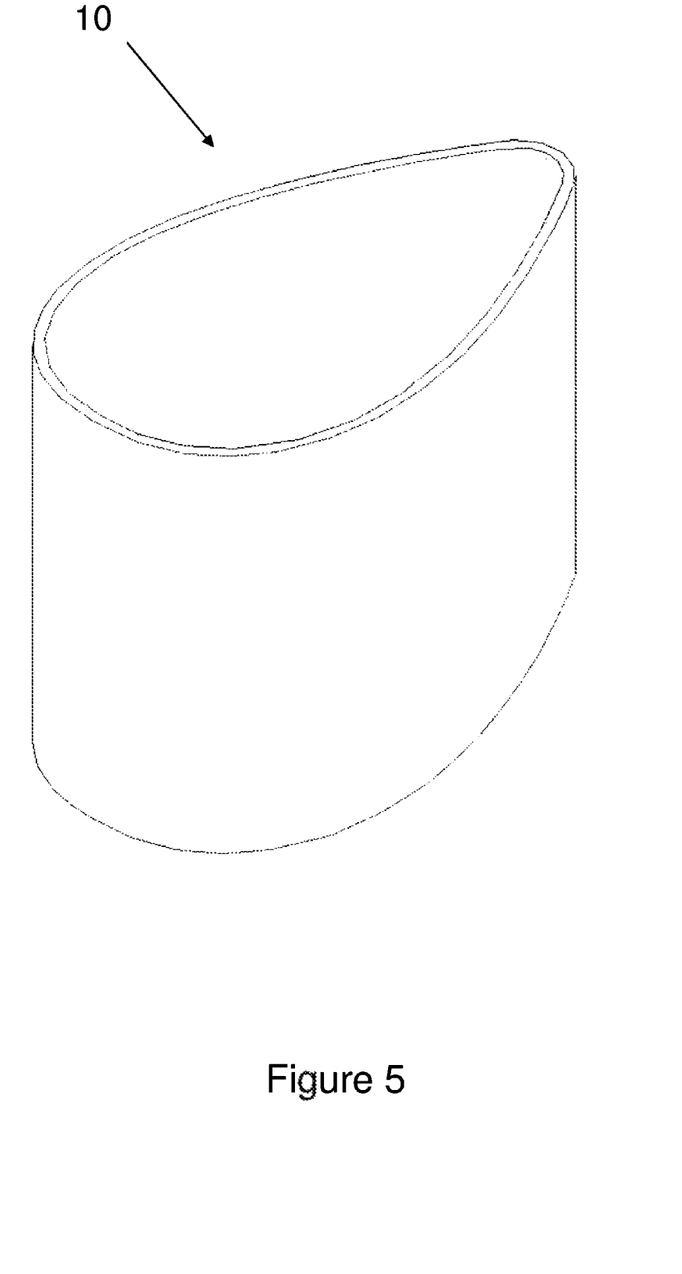
FIG. 5 is a partial section view of the tower of FIG. 1.

The tower 10 may have any suitable cross-sectional shape, such as circular cross-section, or an elongated cross-section with a streamlined aerofoil shape, as shown in FIG. 5. Such an elongated cross-section can be used to minimise drag on the tower and the vorticity downwind from the tower if it is aligned in the direction of the predominant winds.

Figure 6:
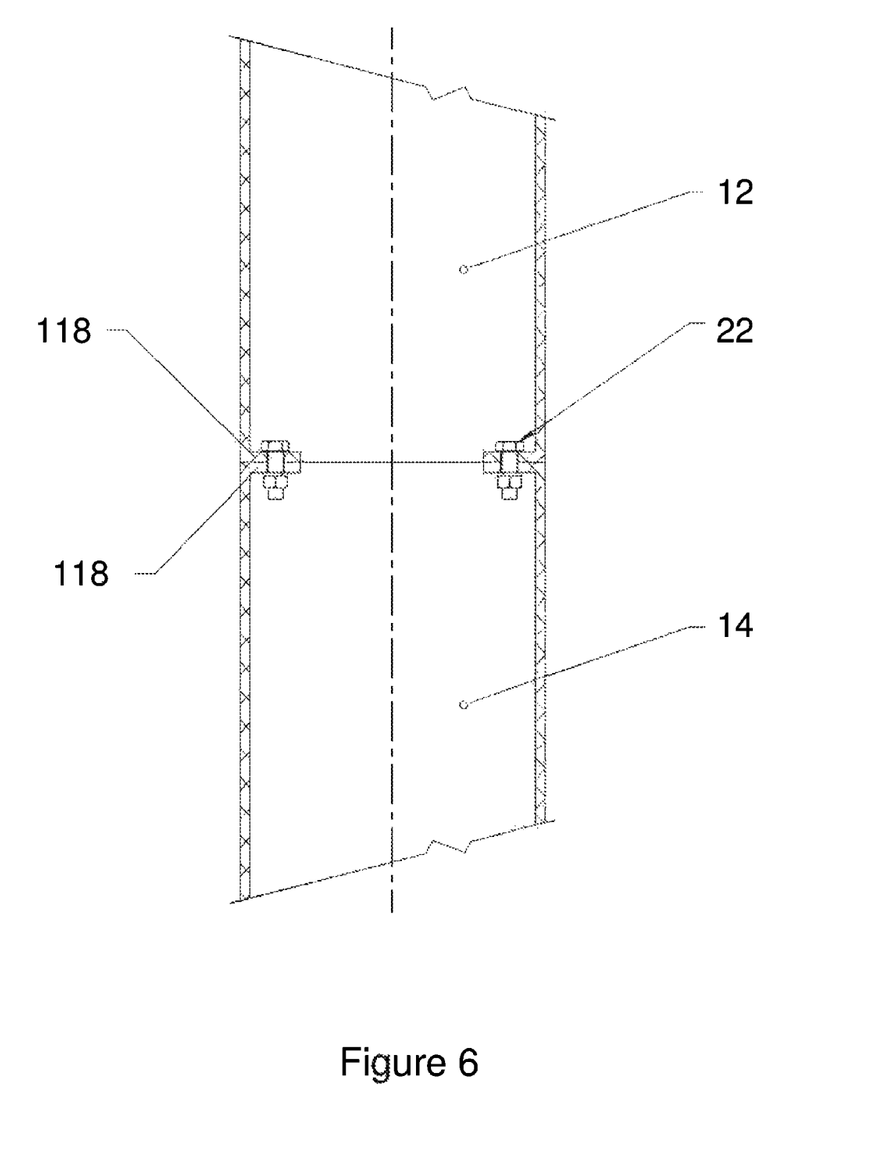
FIG. 6 is a partial section view of the wind turbine tower of FIG. 1, showing a first alternative connection between upper and lower portions.
Figure 7:
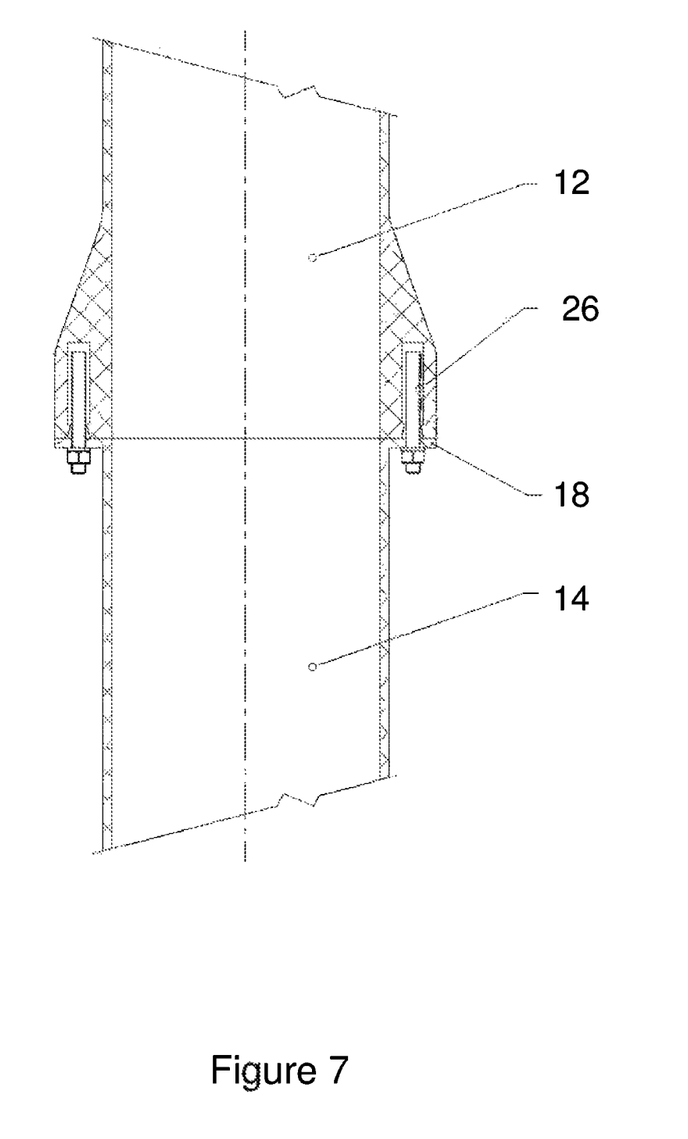
FIG. 7 is a partial section view of the wind turbine tower of FIG. 1, showing a second alternative connection between upper and lower portions.
Figure 8:
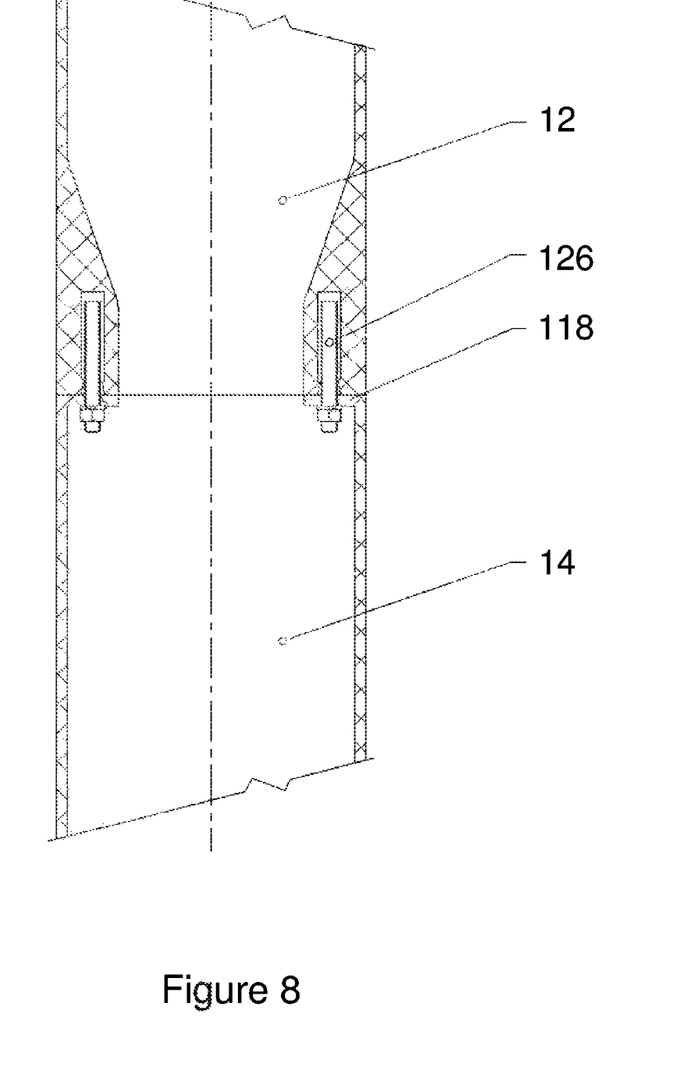
FIG. 8 is a partial section view of the wind turbine tower of FIG. 1, showing a third alternative connection between upper and lower portions.

Rather than having an outwardly extending flange 18, as shown in FIG. 2, an end of each of the upper portion 12 and lower portion 14 may have a flange 118 which extends inwardly by which the two portions 12, 14 may be connected, as shown in FIG. 6. Alternatively, connection may be effected using an outwardly extending flange 18 on one portion 12, 14 in combination with a root insert connection 26 on the outer surface of the other portion 14, 12 (see FIG. 7), or an inwardly extending flange 118 on one portion 12, 14 in combination with a root insert connection 126 on the inner surface of the other portion 14, 12 (see FIG. 8). Root insert connection 126 is essentially the same as root insert connection 26 but extends inwardly from the upper portion 12, rather than extending outwardly from it.

Figure 9:
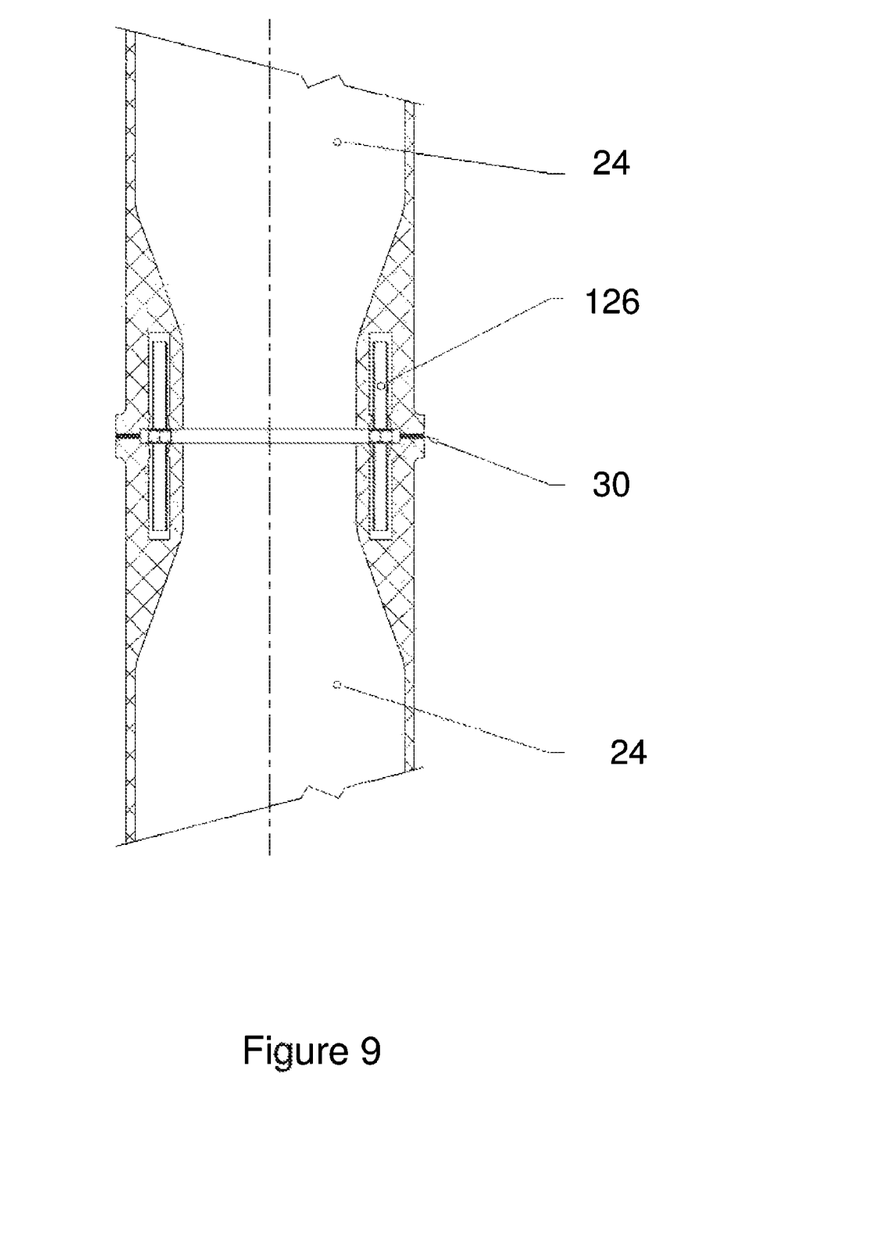
FIG. 9 is a partial section view of a first alternative connection between sections of the upper portion of the tower of FIG. 1.

Consecutive tubular sections 24 may be connected using any suitable fixing means. For example, the tubular sections 24 may be connected using root insert connections 126 extending internally from each section 24, as shown in FIG. 9.

Figure 10:
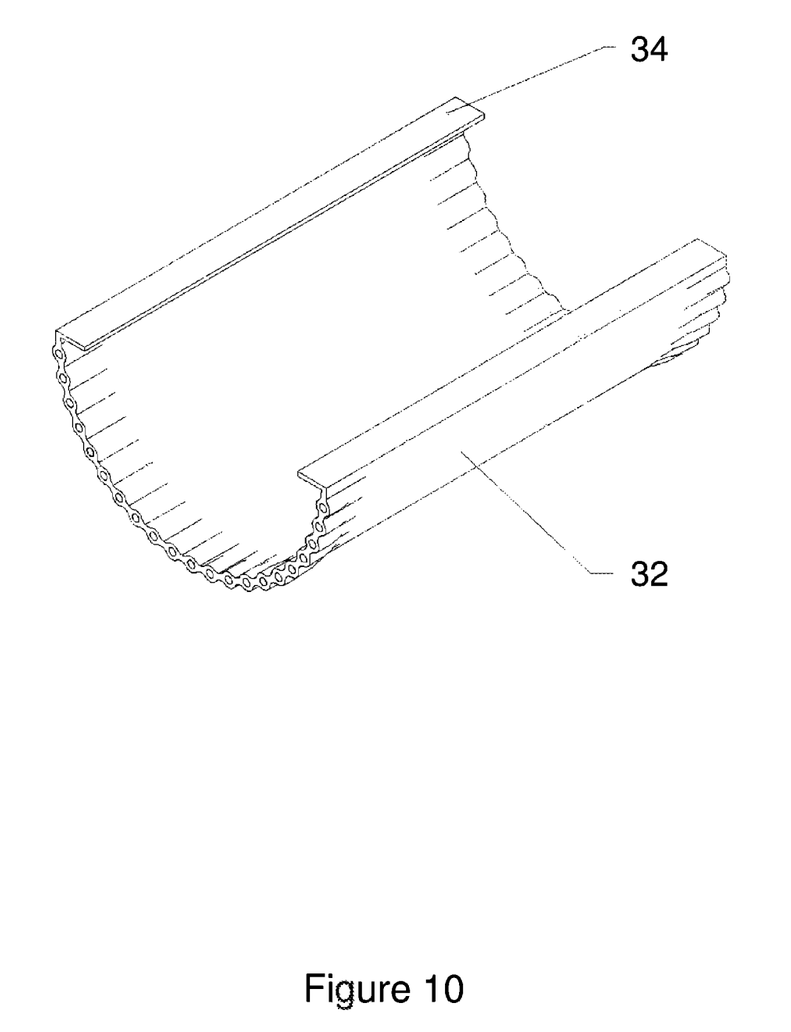
FIG. 10 is a perspective view of a longitudinally divided section which may be used to form the tower of FIG. 1, showing Blade Dynamics' patent inserts.

The upper portion 12, or tubular sections 24, may be divided along the direction of the longitudinal axis 20 of the tower 10 into longitudinally divided parts 32. The longitudinal connection of such divided parts 32 can be achieved by mechanical fastening, bonding, or a combination of both, using, for example, longitudinal flanges 34 (as shown in FIG. 10), lap joints or doublers. Alternatively, the upper portion 12 may be formed from a unitary component, i.e. one which is not subdivided either longitudinally or along the hoop direction.

Figure 11:
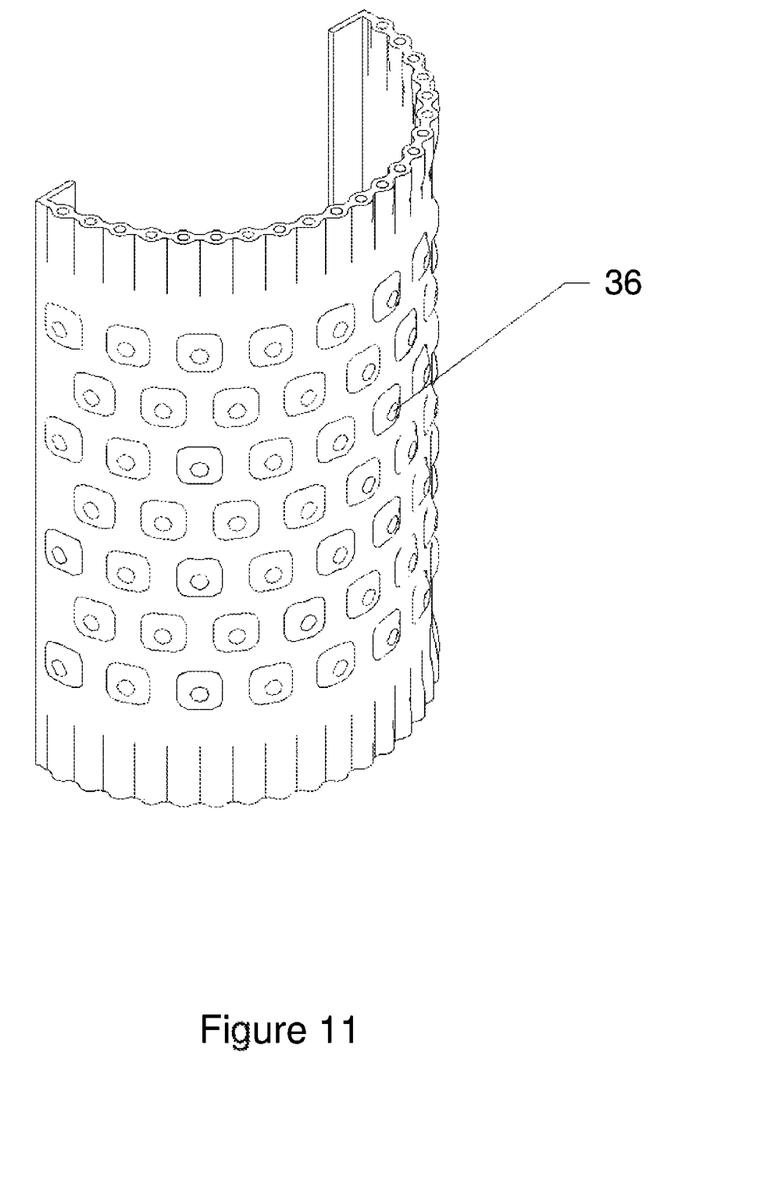
FIG. 11 is a perspective view of the longitudinally divided section of FIG. 10 having protrusions on the outer surface thereof.

The outer surface of the tower 10 may include waves or protrusions 36, as shown in FIG. 11, to reduce drag and vorticity downwind from the tower.

What is claimed is:

1. A self-supporting wind turbine tower with walls comprising:
   an upper portion formed from a composite plastic, the upper portion being subdivided into a plurality of segments arranged in a hoop direction of the tower; and
   a separate, lower portion mounted on a foundation, the upper portion mounted atop the lower portion so as to form the tower, the lower portion formed from a mild steel,
   wherein the self-supporting tower comprises a reduced weight and an increased natural frequency as compared to a tower of an equivalent size constructed entirely of steel.

2. A self-supporting wind turbine tower according to claim 1, wherein the upper portion comprises from 2.0% to 80% of the length of the tower.

3. A self-supporting wind turbine tower according to claim 1, further comprising a plurality of segments arranged in an axial direction of the tower.

4. A self-supporting wind turbine tower according to claim 1, further comprising a gasket positioned between the upper and lower portions.

5. A self-supporting wind turbine tower according to claim 1, wherein the upper portion is hollow.

6. A self-supporting wind turbine tower according to claim 1, wherein the lower portion is hollow.

7. A self-supporting wind turbine tower according to claim 1, wherein the composite plastic comprises a fibre reinforced plastic selected from a group including standard modulus carbon fibre, intermediate modulus carbon fibre, high modulus carbon fibre, and basalt.

8. A self-supporting wind turbine tower according to claim 7, wherein between 50% and 100% of the fibres are arranged at 0 degrees to the axial direction, up to 50% of the fibres are arranged at +/−45 degrees to the axial direction and up to 30% of the fibres are arranged at 90 degrees to the axial direction.

9. A self-supporting wind turbine tower according to claim 1, wherein the composite plastic comprises a viscoelastic material.

10. A self-supporting wind turbine tower according to claim 9, wherein the viscoelastic material is provided as a viscoelastic core.

11. A self-supporting wind turbine tower according to claim 9, wherein the composite plastic comprises a fibre reinforced plastic having a viscoelastic polymer matrix.

12. A self-supporting wind turbine tower according to claim 1, wherein an outer surface of the tower comprises any of undulations, cavities, or protrusions arranged to reduce drag and/or vorticity downwind of the tower.

13. A self-supporting wind turbine tower according to claim 5, wherein the upper portion has a wall thickness which varies along the length of the upper portion.

14. A self-supporting wind turbine tower according to claim 6, wherein the lower portion has a wall thickness which varies along the length of the lower portion.

15. A self-supporting wind turbine tower according to claim 1, wherein the upper portion has a specific stiffness of at least 60 Gpa/(g/cm$^3$).

16. A self-supporting wind turbine tower according to claim 1, wherein the lower portion has a specific stiffness of less than 30 Gpa/(g/cm$^3$).

17. A wind turbine comprising a self-supporting wind turbine tower according to claim 1.

* * * * *